United States Patent Office 3,423,443
Patented Jan. 21, 1969

3,423,443
FLUOROALKYLTIN COMPOUNDS
Walter Blöchl, Karlsruhe, Germany, assignor to FMC Corporation, New York, N.Y., a corporation of Delaware
No Drawing. Filed July 23, 1965, Ser. No. 474,481
Claims priority, application Germany, July 28, 1964, B 77,863
U.S. Cl. 260—429.7          9 Claims
Int. Cl. C07f 7/22; C08g 31/32

---

ABSTRACT OF THE DISCLOSURE

Fluoroalkyltin compounds, useful as stain repellents, have the following formulae:

$R_f(CY_2)_nSnX_3$,
$R_f(CY_2)_nSn(Q)QH$,
$R_f(CY_2)_nSn(Q)QSn(Q)(CY_2)_nR_f$,
$[R_f(CY_2)_n]_2SnX_2$,
$+R_f(CY_2)_n]_2SnO)_p$,
$+R_f(CY_2)_nSn(R)O)_p$, and
$[R_f(CY_2)_n]_3SnX$ in which Y is hydrogen or lower alkyl; X is chlorine, bromine, iodine, alkoxy, acyl, hydrogen, siloxyl or stannoxyl; Q is oxygen or sulfur; R is lower alkyl; $R_f$ is $$CF_2Z(CF_2)_m—$$

where Z is fluorine, chlorine or hydrogen and $m$ is 4–25; $n$ is 2–8; and $p$ designates a polymer.

---

The present invention relates to fluoroalkyltin compounds, the method of their preparation, and their use as antiadhesive and oil-repellent impregnating agents.

Antiadhesive and oil-repellent impregnating agents for textiles of every type, for paper, wood, leather, ceramic surfaces, glass surfaces, and plastic surfaces, such as for example varnishes or articles made of polyester, are being required in ever increasing degrees. The substances primarily available for this purpose are silicones or fluorocarbon resins for dirt-repellent and oil-repellent impregnation. However, it is often difficult to use fluorocarbon resins as emulsions, since they are of limited stability, or have other disadvantages such as discoloration, damage to the fiber to which they are applied, inferior resistance to laundering, and the like.

It has now been found that fluoroalkyltin compounds which contain only hydrogen or alkyl radicals in the α- and β-positions to the tin are excellent impregnating agents for the type of materials mentioned above, and that they do not possess many of the disadvantages of the substances heretofore used for this purpose. The compounds of the above-described class are for the most part extremely stable and generally can be used in the form of homogeneous solutions. Aftertreatment, for example by heating, is not essential. Resistance to laundering is very good, and discoloration does not occur. Accordingly, these solutions are particularly well suited for use in aerosol dispensers by individual consumers. The compounds of this invention include especially the following types, wherein oxygen may partly or wholly be replaced with sulfur:

$R_f(CH_2)_nSnX_3$
$R_f(CH_2)_nSn(O)OH$
$R_f(CH_2)_nSn(O)OSn(O)(CH_2)_nR_f$
$[R_f(CH_2)_n]_2SnX_2$
$R_f(CH_2)_nSn(S)SH$
$R_f(CH_2)_nSn(S)SSn(S)(CH_2)_nR_f$
$+[R_f(CH_2)_n]_2SnO)_p$ $$\left[ R_f(CH_2)_n\overset{R}{\underset{|}{Sn}}O \right]_p$$

$[R_f(CH_2)_n]_3SnX$ in which hydrogen in the alkyl chain may be replaced by lower alkyl radicals such as for example methyl, ethyl, propyl, butyl and amyl; X is a halogen selected from the group consisting of chlorine, bromine and iodine, alkoxy, acyl, hydrogen, siloxyl or stannoxyl; $R_f$ is $CF_3(CF_2)_m—$, $CF_2Cl(CF_2)_m—$, or $CF_2H(CF_2)_m—$, where $m$ is 4 to 25 and preferably 5 to 16; R is lower alkyl; $n$ is 2 to 8 and preferably 2 to 3, and $p$ designates a polymer.

Also suitable as impregnating agents are polystannosiloxanes of linear or crosslinked polymer structure which are readily obtained by cocondensation or cohydrolysis, whose structures are characterized by the following general formulae:

$$\left[ O-\underset{R_2}{\overset{R_1}{\underset{|}{\overset{|}{Si}}}}-\right]_x \left[ O-\underset{R_4}{\overset{R_3}{\underset{|}{\overset{|}{Sn}}}}-\right]_y \quad \left[ O-\underset{R_2}{\overset{R_1}{\underset{|}{\overset{|}{Si}}}}-\right]_x \left[ O-\underset{R_4}{\overset{O}{\underset{|}{\overset{|}{Sn}}}}-\right]_y$$

$$\left[ O-\underset{O}{\overset{R_1}{\underset{|}{\overset{|}{Si}}}}-\right]_x \left[ O-\underset{R_4}{\overset{R_3}{\underset{|}{\overset{|}{Sn}}}}-\right]_y \quad \left[ O-\underset{O}{\overset{R_1}{\underset{|}{\overset{|}{Si}}}}-\right]_x \left[ O-\underset{R_4}{\overset{O}{\underset{|}{\overset{|}{Sn}}}}-\right]_y$$

in which $R_1$, $R_2$ and $R_3$ are methyl, ethyl or $R_f(CH_2)_n—$; $R_4$ is $R_f(CH_2)_n—$, where $n$ is 2 to 8 and preferably 2 to 3, and H may be replaced with methyl; $x$ is 1 to 20; and $y$ is 1 to 20.

These polymers are obtained if compounds of the type $R_4SnCl_3$ or $$\underset{R_3}{\overset{R_4}{\diagdown}}SnCl_2$$

are cohydrolized, either separately or in mixture, with chlorosilanes such as $R_1SiCl_3$, $$\underset{R_2}{\overset{R_1}{\diagdown}}SiCl_2$$

in which case the degree of polymerization can be controlled by the addition of $(CH_3)_3SiCl$. The linear polymers are soluble in acetone and trichloroethylene.

These polymers are also obtained by reacting the corresponding alkoxy silanes with the corresponding fluoroalkyltin acetates $R_4Sn(OOC·CH_3)_3$ or $$\underset{R_3}{\overset{R_4}{\diagdown}}Sn(OOCCH_3)_2$$

The latter method is particularly suitable for producing crosslinked stannosiloxanes in situ on textile and leather materials. In addition to the oil-repellent effect, such resins have a protective fungicidal effect for the substrate which is of special advantage for leather, wood and textiles. The low toxicity of these fungicidal resins as compared with their nonfluorinated homologues is especially advantageous in the case of textiles.

The fluoroalkyltin compounds of this invention may be produced in accordance with the following methods.

(1) By Grignard reaction in the manner generally known:

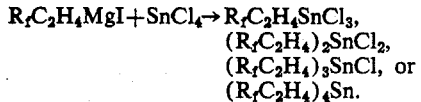

$$R_fC_2H_4MgI + SnCl_4 \rightarrow R_fC_2H_4SnCl_3,$$
$$(R_fC_2H_4)_2SnCl_2,$$
$$(R_fC_2H_4)_3SnCl, \text{ or}$$
$$(R_fC_2H_4)_4Sn.$$

One can operate in accordance with the methods which are used for nonfluorinated compounds and which were given by Van der Kerk and Luigten: Org. Synthesis 36, 86 (1956), or in U.S. Patent No. 2,675,398. Advantageously, the tetraalkyl stannanes can be prepared directly and reduced. They can then be produced by disproportionating according to Kocheshkow in the manner which is known in connection with nonfluorinated alkyl stannanes or fluoroalkyltin chlorides comprises the in this regard. The resulting yields are above 80% based upon the Grignard compound.

(2) The second possible method of producing fluoroalkyl stannes or fluoroalkyltin chlorides comprises the use of the method proposed by Harada in Sci. Pap. Inst. Physic. Chem. Res. (Tokyo) 35, 290 (1939), Zentralblatt (1939) II, 2912, when the reaction is carried out, in a generally known manner with tin alloys of metals of the first to third group of the Periodic Table such as tin-alkali or tin-sodium-zinc alloys:

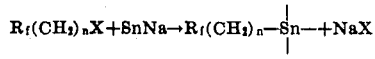

$$R_f(CH_2)_nX + SnNa \rightarrow R_f(CH_2)_n-Sn- + NaX$$

in which X is chlorine, bromine or iodine. Magnesium-tin compounds can equally well be used for this purpose as taught in The Journal of Applied Chemistry, 4, 307 (1954).

Also included in the same class of reaction is the following reaction in which a metal of the first to third group of the Periodic Table, preferably sodium, magnesium or zinc, is reacted with a tin halide and a fluoro-haloiodoalkane:

$$SnCl_4 + 8Na + 4R_f(CH_2)_nX \rightarrow Sn[(CH_2)_nR_f]_4$$

(3) A third generally known process may also be used for the production of fluoroalkylstannanes. Olefins or acetylenes carrying a perfluoro-higher-alkyl chain are very easily added to tin hydrides or alkyl tin hydrides, whereby adding small amounts of azobis(isobutyronitrile) (AIBN) and heating to temperatures between 50 and 70° C. results not only in an ionic reaction, but also preferably in a radical reaction. Ultraviolet light is also very effective. The yields are in excess of 90%; the conversions are very high. Equimolar amounts of the reactants are used:

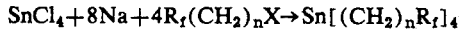

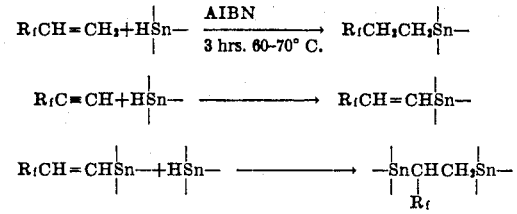

This process makes it possible to produce the following products in three hours by mixing the reactants, adding azobis(isobutyronitrile), and heating to 60–70° C.:

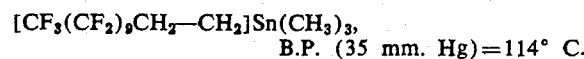
[CF$_3$(CF$_2$)$_9$CH$_2$—CH$_2$]Sn(CH$_3$)$_3$,
  B.P. (35 mm. Hg) = 114° C.
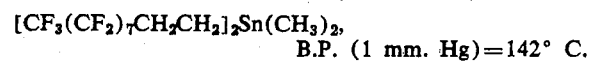
[CF$_3$(CF$_2$)$_7$CH$_2$CH$_2$]$_2$Sn(CH$_3$)$_2$,
  B.P. (1 mm. Hg) = 142° C.
[CF$_3$(CF$_2$)$_5$CH$_2$CH$_2$]$_3$SnCH$_3$,
  B.P. (0.3 mm. Hg) = 135° C.

The fluoro olefins suited for this purpose are exclusively olefins which are not fluorinated on the double bond, so that stannanes are formed which have only hydrogen or alkyl radicals in the 1- and 2-positions of the alkyl portion. Only such compounds are hydrolysis-stable and are suitable for use for permanent impregnation. The following olefins and acetylenes are especially suitable:

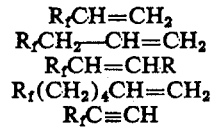

$$R_fCH=CH_2$$
$$R_fCH_2—CH=CH_2$$
$$R_fCH=CHR$$
$$R_f(CH_2)_4CH=CH_2$$
$$R_fC\equiv CH$$

in which R is alkyl, aryl or aralkyl; and $R_f$ is perfluoroalkyl, ω-chloroperfluoroalkyl or ω-hydrogen perfluoroalkyl, preferably having 6–25 carbon atoms.

All olefins of the above-indicated types, in admixture with in hydrides with or without a solvent such as benzene can be aded almost completely to the tin-hydrogen bond by irradiation with ultraviolet light or with a radical forming catalyst, preferably azobis(isobutyronitrile), at the associated decomposition temperature of the radical former—about 60 to 70° C. in the case of azobis(isobutyronitrile)—over a period of several hours. The resulting tetraalkyltins are converted, by disproportionation with tin tetrachloride in a manner known per se, to dialkyltin dichlorides and alkyltin trichlorides. This reaction mixture is advantageously reacted with sodium methoxide which converts it into the ortho-stannonic esters. When dissolved in trichloroethylene, these esters can be used to impregnate a substrate. After drying and possibly curing, a washproof, oleophobic and fungicidal impregnating effect is obtained.

(4) Another novel method consists in the addition of perfluoroiodoalkane, ω-chloroperfluoroidoalkane and ω-hydrogen-perfluoroiodoalkane to unsaturated organic tin compounds according to radical or thermal reaction. The reaction is thermally initiated by heating at 150–220° C. for one or more hours, at 220–300° C. for less than one hour and preferably for less than 20 minutes, or at temperatures in excess of 300° C. for less than 10 minutes and preferably for 40 seconds. The reaction may be carried out in liquid phase under pressure or in vapor phase under elevated, normal or reduced pressure. The readily available vinyl, allyl, propargyl, ethinyl-stannanes and the corresponding chlorostannanes are the preferred unsaturated tin compounds. Yields are mostly in excess of 90%. The resulting fluoroiodoalkyltin compounds can advantageously be freed of iodine with reducing agents, the compounds being preferably shaken with aqueous sodium bisulfite solution or other reducing agents, or the iodine in the fluoroalkylstannane being replaced with hydrogen by means of zinc or palladium-activated zinc, in aqueous, strongly hydrochloric solution or in glacial acetic acid.

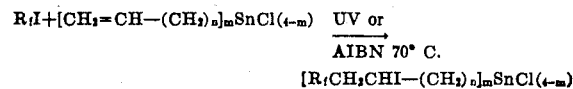

$$R_fI + [CH_2=CH—(CH_2)_n]_mSnCl_{(4-m)} \xrightarrow[\text{AIBN 70° C.}]{\text{UV or}}$$
$$[R_fCH_2CHI—(CH_2)_n]_mSnCl_{(4-m)}$$

Depending on the desired product, the fluorinated tetraalkyltins may be reacted with tin tetrahalide in the desired ratio by heating for several minutes to 200° C. thereby disproportionating according to Kosheshkow, possibly by adding a Lewis acid catalyst, such as aluminum chloride or zinc chloride (British Patent 739,883).

Especially the stannonic and thiostannonic acids which are prepared from fluoroalkyltin trichlorides and which are obtained by saponification, in a manner known per se, with alkalies or alkali sulfides (Ber. 36, 1057 (1903), and 62, 997 (1920), or their esters are eminently suitable in solutions of trichloroethylene and ethanol for impregnating textiles, leather, wood, and other substances by dipping and squeezing, or spraying, or brushing, and subsequently drying. If desired, the impregnating agent may be fixed especially strongly by heating to about 80–140° C.

EXAMPLE 1

Twelve grams of vinyltin trichloride additionally containing 10% divinyltin dichloride were dissolved in 20 g. of diisopropyl ether, to which 33 g. of perfluorodecyl iodide were added. This mixture was irradiated with a 500 watt ultraviolet lamp for 48 hours while being stirred in a Pyrex tube, and while the contents of the Pyrex tube were cooled by means of an air jet. This reaction mixture was added drop by drop with cooling and stirring into 100 cc. of methanol in which 8 g. of sodium methoxide were dissolved. The sodium chloride was filtered off. The filtrate was dissolved in 1000 cc. of trichloroethylene and sprayed on linen cloth, until it was completely saturated. The textile sample was dried in a drying chamber at 120° C. for 15 minutes. When a drop of paraffin oil was applied to the cloth, it was not absorbed. Cyclohexane flowed off in the form of beads. The cloth also repelled water. In contrast to a comparable piece of untreated fabric, the test sample, when stored in moist heat for 3 weeks, had neither an unpleasant odor nor did it show any traces of fungi.

EXAMPLE 2

Tetravinyltin (2.83 g.) was dissolved in 22 g. of perfluorooctyl iodide. The reaction mixture was irradiated, in a liquid layer 2 mm. thick, with a 500 watt mercury vapor high-pressure lamp. Cooling with air prevented the temperature from rising too high, and stirring by means of a magnetic stirrer provided a good liquid exchange at the layer of irradiation. The use of extremely pure nitrogen prevented access of oxygen to the Pyrex irradiation vessel. The reaction was completed after 12 hours. According to gas-chromatographic analysis, the reaction mixture contained only 5% perfluoroalkyl iodide. The entire reaction mixture was mixed with 5.5 g. of tin tetrachloride; after 0.3 g. of $AlCl_3$ had been added, the mixture was heated to 120° C. for 2 hours. The product was mixed with 60 cc. of methanol and vigorously shaken with zinc turnings for 2 hours.

A 2% solution of this reaction mixture containing $$C_8F_{17}CH_2CH_2Sn(OCH_3)_3$$

and $$(C_8F_{17}CH_2CH_2)_2Sn(OCH_3)_2$$

in trichloroethylene was used to saturate porous clay pottery fragments which were exposed to normal moist air for some time until the HCl-vapors had evaporated. This treatment made the clay shard oil-repellent and water-repellent. Paraffin oil was no longer able to penetrate the shard. A cotton fabric impregnated in the same manner, which was neutralized immediately after impregnation by being gassed with $NH_3$, showed an excellent hydrocarbon-repellent effect. It repelled methylene chloride in the form of beads in the same manner as it did cyclohexane, benzene, and paraffin oil.

EXAMPLE 3

One gram of the irradiated reaction product of Example 1 containing $$C_{10}F_{21}CH_2CHISnCl_3$$

and $$(C_{10}F_{21}CH_2CHI)_2SnCl_2$$

was added, drop by drop, to 20 cc. of methanolic sodium methoxide containing 80 mg. of sodium. The mixture was stirred well and cooled. The precipitated sodium chloride was decanted, and this solution was then vigorously shaken for 1 hour with 10 g. of 0.5% sodium amalgam. The amalgam was then separated, and the solution was mixed with 20 cc. of trichloroethylene and strongly acidified with concentrated aqueous hydrochloric acid. The heavier trichloroethylene phase was separated and washed again with 20% aqueous HCl. The resulting trichloroethylene solution was dried with a small amount of sodium sulfate and neutralized with anhydrous methanolic sodium methoxide, the end point being determined by spotting on moist filter paper at pH=7. After the NaCl has been decanted off, the mixture containing $$C_{10}F_{21}CH_2CH_2Sn(OCH_3)_3$$

and $$(C_{10}F_{21}CH_2H_2)_2Sn(OCH_3)_2$$

was diluted with 40 cc. of trichloroethylene and then used to impregnate a linen cloth, which was then dried at 150° C. for 15 minutes thereby forming $$C_{10}F_{21}CH_2CH_2Sn(O)OSn(O)CH_2CH_2C_{10}F_{21}$$

and $$\pm(C_{10}F_{21}CH_2CH_2)_2SnO\pm_2$$

This cloth repelled cyclohexane, heptane, water, paraffin oil and petroleum ether in the form of beads. This cloth was stored in a moist atmosphere at 30° C. for 3 weeks, and no spots or stains formed, and the odor remained unobjectionable, in contrast to a similar nontreated cloth.

EXAMPLE 4

Allyltin trichloride (2.7 g.) was mixed with 7 g. of 1-iodo-10-chloroperfluorodecane, and this mixture was treated with 0.3 g. of azobis(isobutyronitrile). The mixture was slowly heated in an autoclave to 70° C. within 1 hour under exclusion of air and vigorous stirring and kept at said temperature for five hours. After that time, another 0.3 g. of azobis(isobutyronitrile) were added, and the mixture was heated in the same manner. Five grams of this reaction mixture were added drop by drop to 40 cc. of methanol, and zinc turnings previously activated with some palladium was introduced under stirring and cooling. After two hours of stirring, during which time some HCl-gas was introduced, the solution was decanted and mixed with twice its volume of trichloroethylene. The mixture was then shaken with about 50 cc. of 25% aqueous hydrochloride acid, the separated trichloroethylene solution was washed again with 30 cc. of 25% hydrochloric acid, and dried over sodium sulfate. By spotting on moist pH-paper, the solution is neutralized with aqueous methanolic sodium methoxide solution. The sodium chloride was decanted. After this solution containing $CF_2Cl(CF_2)_9(CH_2)_3Sn(OCH_3)_3$ had been diluted with trichloroethylene in the proportion of 1:10, a piece of suede was dipped into the solution, squeezed out and dried at about 50° C. for 10 minutes. The piece of suede was then stored under normal room conditions for one day. This piece of suede had become oil repellent; a drop of toluene was no longer able to penetrate it. If mayonnaise is rubbed thereon to produce a stain, the latter can readily be removed with a moist soapy handkerchief.

EXAMPLE 5

Diallyltin dichloride (2.7 g.) was mixed with 16 g. of 1-iodoperfluorodecane, and this mixture was pressed from the top, at a speed of 0.6 g./min., into a Pyrex tube having a length of 2 m. and an inside diameter of 6 mm., which was wound to form a vertical spiral. The spiral was heated to 300° C. At the other end of the spiral, the reaction product was introduced into 100 cc. of methanol under cooling. The operating pressure in the spiral was 1 atmosphere absolute. The methanol was neutralized with ammonia gas and saturated with ammonium chloride. This reaction mixture was stirred with 30 g. of zinc turnings for 5 hours. The mixture was then decanted, 100 cc. of trichloroethylene were added, and the mixture was washed twice with 20% hydrochloric acid. The solution which contained $$(C_{10}F_{21}(CH_2)_3)_2Sn(OCH_3)_2$$

was dried with sodium sulfate. After 5 g. of methyltrichlorosilane had been added, the mixture was neutralized with methanolic sodium methoxide solution and diluted with trichloroethylene in the proportion of 1:30. This reaction product containing

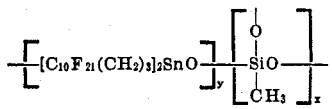

was used for saturating wood used in the construction of ships. After the saturation, which was carried out by alternate vacuum and pressure effects, the wood was dried in the air for 10 days. This wood was not wettable by water and did not absorb any oil which was on the water in the form of an oil or dirt film. Ships produced from this wood, after staying in water for a prolonged period of time do not increase much in weight, nor do they have a dirt ring along the water line, as was determined from the behavior of a test sample. Also, the wood did not show any indication of putrefaction after a prolonged period of time.

EXAMPLE 6

Ten grams of 1-iodo-1,1,2,2,10-pentahydroperfluorodecane were reacted with 5 g. of finely divided tin-sodium-zinc alloy in the proportion of 45:40:15 percent by weight in 50 cc. of tetrahydrofuran to produce, under good stirring, the corresponding tetra alkyltin. The solution was decanted and concentrated by evaporation. This stannane was mixed with 2 g. of tin tetrachloride; 0.1 g. of zinc chloride was added, and the mixture was heated to 140° C. for 8 hours. The reaction mixture containing $$[CF_2H(CF_2)_9CH_2CH_2]_3SnCl$$

and $$[CF_2H(CF_2)_9CH_2CH_2]_2SnCl_2$$

was then mixed with 1 g. of methyltrichlorosilane and 2 g. of dimethylchlorosilane after cooling. The mixture was dissolved in 80 cc. of tetrahydrofuran. A pane of glass was treated with this solution. After the glass pane had been allowed to dry in the air for two hours with resulting cohydrolysis, fingerprints and greasy dirt were removed with a dry flannel cloth without having to use leather. Oil splashes did not form greasy film on the pane, but were readily wiped off.

EXAMPLE 7

Ten cubic centimeters of the solution prepared in Example 6 were mixed with 0.3 of pyridine, and a filter paper was dipped into the mixture. The filter paper was cured in the dryer at 120° C. for 10 minutes. In contrast to a nontreated comparative piece of paper, the treated paper did not become dirty, even when touched frequently with slightly dirty hands.

EXAMPLE 8

A polyester boat shell was coated with the solution described in Example 3, whereupon the boat was exposed to strong sun rays. After five hours, the plastic boat was launched in water. Even after the boat had been in contaminated water for several days, there was no dirt ring along the water line which could not be removed by simple wiping, whereas a nontreated boat had on obstinately adhering dirt ring.

EXAMPLE 9

A plastic mold and a metal mold for the production of polyester articles were treated as described in Example 8. The coating imparted to the molds an extremely good release property for thermoplastic and thermoset resins.

EXAMPLE 10

A mixture consisting of 30 percent by weight of vinyltin trichloride and 70 percent of 1-iodoperfluorooctane was pressed at a speed of 25 g./min. through a Hastelloy C tube having an inside diameter of 4 mm. and a length of 1 m. by means of a high-pressure metering pump. The temperature of the reaction tube was maintained at 300° C. After a residence time of about 50 seconds, the reaction mixture was depressurized from 200 atm. to atmospheric pressure by way of a pressure valve and was introduced into ethanol. The resulting solution was shaken with zinc turnings; after the zinc had been separated, the solution containing $$C_8F_{17}CH_2CH_2Sn(OC_2H_5)_3$$

in 0.1 to 0.3% concentration was applied directly to a piece of linen cloth. After a drying time of 6 minutes, the piece of cloth was strongly oleophobic and hydrophobic. Cyclohexane drops flowed off in the forms of beads and did not penetrate.

EXAMPLE 11

Vinyltin trichloride (25.2 g.) and 70 g. of 1-iodoperfluorodecane were dissolved in 400 cc. of isopropyl ether and were heated at reflux for 10 hours after 1 gram of azobis(isobutyronitrile) had been added. Thereafter, 0.5 g. of azobis(isobutyronitrile) were added twice, and the mixture was heated for 5 hours. The resulting reaction mixture was freed of isopropyl ether by vacuum distillation, and the residue was introduced into 500 cc. of methanol. This solution was well stirred with 100 g. of zinc turnings for 1 hour, whereupon the zinc was separated, 500 cc. of isopropyl ether were added, and the solution was then allowed to pass slowly through a dehydrated ion exchanger column, soaked with methanol, containing about 250 cc. of a strongly basic, chloride-charged Dowex 2-X8 anion exchanger resin, so that practically all iodide ion was exchanged for chloride ion by the column. 50 cc. of the solution were then diluted with 150 cc. of trichloroethylene, and the resulting solution containing $$C_{10}F_{21}CH_2CH_2Sn(OCH_3)_3$$

was used to impregnate pieces of linen cloth, cotton poplin and fabric made of polyester fiber, as well as a piece of suede, paper, a roll of yarn, and a piece of cellophane film. After being dried at temperatures between 80° C. and 120° C. for 20 mintues, all substrates thus treated became strongly oil-, water-, dirt-, and adhesive-repellent; oil and gasoline flowed off these substrated in the form of beads.

EXAMPLE 12

Thirty-three grams of vinyltin trichloride were mixed with 100 g. of 1-iodo-10-chloroperfluorodecane, and were irradiated for 17 hours in a layer 2 mm. thick at a distance of 5 cm. with a 500 watt mercury vapor lamp while being cooled with air. The reaction mixture was then dissolved in 900 cc. of ethanol and was shaken for 1 hour with an abundant amount of 0.5% sodium amalgam. The solution was then separated from the reducing agent, processed according to the procedure set forth in Example 11, and the resulting solution containing $$CF_2Cl(CF_2)_9CH_2CH_2Sn(OC_2H_5)_3$$

was used for impregnating cotton poplin and a piece of filter paper. After being dried at 120° C. for 10 minutes, the substrates containing $CF_2Cl(CF_2)_9CH_2CH_2Sn(O)OSn(O)CH_2CH_2(CF_2)_9CF_2Cl$ had a strongly oleophobic and hydrophobic character.

EXAMPLE 13

Thirty-three grams of vinyltin trichloride were mixed with 100 g. of 1-iodoperfluorodecane, and were irradiated for 17 hours in a layer 2 mm. thick at a distance of 5 cm. with a 500 watt mercury vapor lamp while being cooled with air. The reaction mixture was then dissolved in 900 cc. of ethanol and was shaken for 1 hour with 100 g. of zinc turnings. The solution containing $C_{10}F_{21}CH_2CH_2Sn(OC_2H_5)_3$ was then separated from the reducing agent, diluted with 3 times its volume of trichloroethylene, and used directly for impregnating cotton poplin and a piece of filter paper. After being dried at 120° C. for 10 minutes, the substrates containing $CF_3(CF_2)_9CH_2CH_2Sn(O)OSn(O)CH_2CH_2(CF_2)_9CF_3$ had a strongly oleophobic and hydrophobic character.

EXAMPLE 14

Three hundred cubic centimeters of the alcohol solution obtained according to Example 11 after being treated with the ion exchange resin, were added drop by drop with stirring to 80 cc. of a 5% caustic soda solution; the resulting emulsion was diluted with 1200 cc. of water. This solution containing the sodium salt of $C_{10}F_{21}CH_2CH_2Sn(O)OH$ was used to impregnate a piece of linen cloth, a piece of filter paper and a roll of synthetic yarn; these substrates were dried in the air at normal temperature. After several hours, the substrates which were neutralized with dilute acetic acid had a strong oleophobic property. They repelled cyclohexane in the form of beads.

EXAMPLE 15

Three hundred cubic centimeters of the solution obtained according to Example 12 was stirred for 5 hours, after reduction, with 100 cc. of dehydrated, methanol soaked, chloride-charged, strongly basic Dowex 2–X8 anion exchange resin and then decanted. This solution was diluted with 200 cc. of an aqueous 4% sodium sulfide solution, and then with 1000 cc. of water. The solution prepared in this manner containing $CF_2Cl(CF_2)_9CH_2CH_2Sn(S)SH$ was used to impregnate a piece of textile fabric made of viscose staple, a piece of cotton fabric and a piece of filter paper. The substrates were dried at 100° C. and then hardened by being heated with a hot iron. All pieces thus impregnated with $CF_2Cl(CF_2)_9CH_2CH_2Sn(S)SSn(S)CH_2CH_2(CF_2)_9CF_2Cl$ repelled oil, gasoline, heptane and water and were dirt- and adhesive-repellent.

EXAMPLE 16

17 g. of vinyltin trichloride, 9 g. of divinyltin dichloride and 9 g. of dibutyltin dichloride were mixed with 100 g. of 1-iodoperfluorodecane and irradiated in a 2 mm. layer with a 500 watt ultraviolet mercury vapor lamp for 12 hours. This reaction mixture was carefully added drop by drop to 300 cc. of ethanol and shaken with 10 g. of zinc turnings for 1 hour. After the zinc turnings had been separated, the solution containing $C_{10}F_{21}CH_2CH_2Sn(C_4H_9)(OC_2H_5)_2$ was diluted with trichloroethylene and used for the impregnation of textiles by soaking, drying, and heating at 120° C. for a short time. All substrates treated in this manner contained ${C_{10}F_{21}CH_2CH_2Sn(C_4H_9)O}_2$ and showed strong oil- and water-repellent characteristics.

EXAMPLE 17

The alcohol solution of the ortho-ethyl ester of fluoroalkylstannonic acid obtained according to Example 16 was slowly passed through a column of dehydrated, chloride-charged Dowex 2–X8 anion exchange resin which had been soaked with ethanol. The resulting iodide-free solution containing $C_{10}F_{21}CH_2CH_2Sn(C_4H_9)(OC_2H_5)_2$ was diluted to a concentration of 3% and then used for impregnating textiles and leather. The resulting substrates had strong oil- and water-repellent characteristics.

EXAMPLE 18

100 cc. of the iodide-free alcohol solution obtained according to Example 17 was added drop by drop with stirring to 60 cc. of a 10% aqueous sodium hydroxide solution. The resulting emulsion containing $C_{10}F_{21}CH_2CH_2Sn(OH)_2C_4H_9$ was then diluted with 900 cc. of water and used to impregnate a thoroughly washed fabric containing a mixture of cotton and viscose staple, a cellophane film and a piece of linen; these substrates were squeezed out, dried and heated to 120° C., and treated with carbon dioxide gas, whereupon the alkalies were washed out with water. The substrates treated in this manner contained.

${C_{10}F_{21}CH_2CH_2Sn(C_4H_9)O}_2$ and were oil-, dirt-, adhesive-, and water-repellent; they were also protected against fungi.

EXAMPLE 19

Ten grams of vinyltin trichloride together with 30 g. of 1-iodoperfluorododecane were dissolved in 60 g. of diisopropyl ether under exclusion of oxygen and intensive cooling and irradiated under stirring for 20 hours in a layer 5 mm. thick with a 1000 watt mercury high-pressure vapor lamp from a distance of 10 cm. A vigorous stream of hydrogen sulfide was then passed through the reaction mixture for two hours, the temperature being raised slowly to 50° C. The lost ether was replaced with methylchloroform. This solution was again briefly shaken with $H_2S$-saturated water for removing the hydrohalic acids and then dried over sodium sulfate. A 1 to 10% dilution of this solution containing $C_{12}F_{25}CH_2CH_2Sn(S)SH$ was used as a mold release agent by applying it to resin casting molds, vulcanizing molds and calender rolls and baked-in at temperatures up to 120° C. Metal and plastic molds coated in this manner with $C_{12}F_{25}CH_2CH_2Sn(S)SSn(S)CH_2CH_2C_{12}F_{25}$ were used without renewing the coating about 3 times more often than molds with silicone mold-release impregnation used under similar conditions. A dilute solution of this fluoroalkylthiostannonic acid was used to impregnate textiles, yarns and threads made of synthetic fibers, wool, leather, wood, and plastic films, all of which became strongly oil- and water-repellent after they had been simply wetted and dried.

EXAMPLE 20

Three grams of tetravinyltin and 30 g. of 1-iodo-8-chloroperfluorooctane were dissolved in 60 g. of acetone and irradiated with a 300 watt mercury high-pressure immersion lamps under strong cooling and stirring. After 10 hours, the acetone was distilled out of this reaction mixture; after 200 cc. of isopropanol had been added, the mixture was shaken for 1 hour with zinc turnings and some ammonium bromide for deiodination. After the metal had been separated, 200 cc. of carbon tetrachloride were added, and the mixture was shaken with water. The resulting dried carbon tetrachloride solution of fluoroalkylstannane was concentrated by evaporation until all of the carbon tetrachloride was distilled off. The resulting stannane was dissolved in 11 g. of tin tetrachloride while heating under reflux, and stirred for 8 hours at temperatures up to 110° C. while excluding moisture. In order to accelerate the reaction, AlCl₃ was added. This reaction mixture containing $$CF_2Cl(CF_2)_7CH_2CH_2SnCl_3$$

was used directly in an inert solvent such as methyl chloroform, or in a methanol, glycol, or polyglycol solution for impregnating textiles, fiber mats and yarns of all kinds and regenerated cellulose. The substrates were moistened with diluted solutions of about 1 to 5% concentrations and dried. Where necessary, they were subsequently neutralized with ammonia and heated to 120° C. for 5 minutes. All substrates impregnated in this manner had a pronounced oil- and water-repellent character.

EXAMPLE 21

Three grams of tetravinyltin and 28 g. of 1-iodo-8-hydroperfluorooctane were dissolved in 60 g. of acetone and irradiated with a 300 watt mercury high-pressure immersion lamp under strong cooling and stirring. After 10 hours, the acetone was distilled out of this reaction mixture; after 200 cc. of isopropanol had been added, the mixture was shaken for 1 hour with an abundant amount of 0.2% sodium amalgam for de-iodination. After the metal had been separated, 200 cc. of carbon tetrachloride were added, and the mixture was shaken with water. The resulting dried carbon tetrachloride solution of fluoroalkylstannane was concentrated by evaporation until all of the carbon tetrachloride was distilled off. The resulting stannane was dissolved in 11 g. of tin tetrachloride while heating under reflux, and stirred for 8 hours at temperatures up to 110° C. while excluding moisture. In order to accelerate the reaction, ZnCl₂ was added. This reaction mixture containing $$CF_2H(CF_2)_7CH_2CH_2SnCl_3$$

was used directly in an inert solvent such as methyl chloroform, or in a methanol, glycol, or polyglycol solution for impregnating textiles, fiber mats and yarns of all kinds and regenerated cellulose. The substrates were moistened with diluted solutions of about 1 to 5% concentration and dried. Where necessary, they were subsequently neutralized with sodium bicarbonate solution and heated to 120° C. for 5 minutes. All substrates impregnated in this manner had a pronounced oil- and water-repellent character.

EXAMPLE 22

Three grams of tetravinyltin were reacted with 40 g. of 1-iodoperfluorododecane and then treated as described in Example 20. Instead of using acetone, diisopropyl ether was used. The resulting $C_{12}F_{25}CH_2CH_2SnCl_3$ was heated under reflux with 40 g. of acetic anhydride. The resulting $$C_{12}F_{25}CH_2CH_2Sn[C(O)CH_3]_3$$

was used in a 0.5 to 5% methyl ethyl ketone solution for the oil-repellent impregnation of textiles by simple dipping and drying, or as mold release agent for rubber vulcanizing and plastic molds. Cellophane and polyethylene films became strongly antiadhesive after being treated with such solutions.

EXAMPLE 23

Three grams of tetravinyltin were reacted with 25 g. of 1-iodoperfluorohexane and then treated as described in Example 20. Instead of using acetone, diisopropyl ether was used. The resulting $C_6F_{13}CH_2CH_2SnCl_3$ was heated under reflux with 40 g. of acetic acid. The resulting $$C_6F_{13}CH_2CH_2Sn[C(O)CH_3]_3$$

was used in 0.5 to 5% methyl ethyl ketone solutions for the oil-repellent impregnation of textiles by simple dipping and drying, and as mold release agent for rubber vulcanizing and plastic molds. Cellophane and polyethylene films became strongly anti-adhesive after being treated with such solutions.

EXAMPLE 24

Ten grams of the fluoroalkyltin triacetate, obtained according to Example 22 were dissolved in 40 g. of methyl isobutyl ketone to which 5 g. of dimethyldiethoxysilane were added, and the mixture was applied to a cotton fabric, a polyester sewing thread, a flat-headed screw for wood, and a flat iron. After these articles had been heated briefly, they showed a strongly dirt-repellent character. The screws were strongly anti-adhesive, and it was therefore much easier to screw them into moisture wood. The iron did not absorb starch residues from the laundry being ironed, whereas starch residues stuck to the bottom of the iron when it was not treated.

EXAMPLE 25

Ten grams of fluoroalkyltin trichloride produced according to Example 20 were reacted with a mixture of 20 g. of acetylacetone and 20 g. of butanol. This acidic solution was neutralized with a small amount of aqueous caustic soda solution and, after 100 mg. of perfluorooctanoic acid ammonium salt had been added, was emulsified in an Ultraturrax blender in 30 g. of water. This emulsion containing $$CF_2Cl(CF_2)_7CH_2CH_2Sn(OC_4H_9)_3$$

was diluted with an additional amount of water and used, in 0.3 to 3% dilution, as mold release agent and for the oil-repellent impregnation of textiles and paper. The substrates were saturated in said emulsion, dried and heated to 120° C. for 10 minutes. The substrates contained $$CF_2Cl(CF_2)_7CH_2CH_2Sn(O)OSn(O)CH_2CH_2(CF_2)_7CF_2Cl$$

and repelled oil, gasoline and water.

EXAMPLE 26

One hundred-sixty grams of diallyl, together with 9 g. of butyltin trihydride, were slowly heated in 100 g. of diisopropyl ether at 50 to 60° C. under stirring for 8 hours, at the start of which 1 g. of azobis(isobutyronitrile) was added, and 0.5 g. of the same compound were added every 2.5 hours thereafter. The operation was carried out under the exclusion of oxygen. The excess diallyl and the solvent were distilled out of this mixture. After 120 g. of 1-iodoperfluorodecane and 200 g. of diisopropyl ether had been added, the reaction mixture was heated at 70° C. under exclusion of oxygen, 1 g. of azobis(isobutyronitrile) being added every 3 hours. After 12 hours, 300 cc. of isopropanol were added, and the mixture was shaken with an abundant amount of 0.5% sodium amalgam. After 300 cc. of trichloroethylene had been added while shaking and 300 cc. of water had been added, the trichloroethylene solution was decanted and dried, and the trichloroethylene was distilled off. 40 g. of tin tetrachloride were added to the remaining fluoroalkyltin and the mixture was heated at 120° C. for 6 hours. This produced $C_{10}F_{21}(CH_2)_6SnCl_3$ which was used, in alcoholic solution, after neutralization with sodium methoxide where necessary, as 0.5 to 5% impregnating solutions for treating textile fabrics of all kinds, yarns, paper, cellophane films, and vulcanizing molds. The substrates wetted with these solutions were dried and advantageously heated to 120° C. for a few minutes. All substrates treated in this manner contained $$C_{10}F_{21}(CH_2)_6Sn(O)OSn(O)(CH_2)_6C_{10}F_{21}$$

and showed a strong oil- and hydrocarbon-repellent effect and were very strongly anti-adhesive.

EXAMPLE 27

200 g. of diallyl ether, together with 9 g. of butyltin trihydride, were slowly heated in 100 g. of diisopropyl ether at 50 to 60° C. under stirring for 8 hours, at the start of which 1 g. of azobis(isobutyronitrile) was added, and 0.5 g. of the same compound are added every 2.5 hours thereafter. The operation was carried out under the exclusion of oxygen. The excess diallyl ether and the solvent were distilled out of this mixture. After 120 g. of 1-iodoperfluorodecane and 200 g. of diisopropyl ether had been added, the reaction mixture was heated at 70° C. under exclusion of oxygen, 1 g. of azobis(isobutyronitrile) being added every 3 hours. After 12 hours, 300 cc. of isopropanol were added, and the mixture was shaken with an abundant amount of 0.5% sodium amalgam. After 300 cc. of trichloroethylene had been added under shaking and 300 cc. of water had been added, the trichloroethylene solution was decanted and dried, and the trichloroethylene was distilled off. 40 g. of tin tetrachloride were added to the remaining fluoroalkyl ether stannane, and the mixture was heated at 120° C. for 6 hours. This produced $$C_{10}F_{21}(CH_2)_3O(CH_2)_3SnCl_3$$

which was used, in glycolic solution, after neutralization with sodium methoxide where necessary, as 0.5 to 5% impregnating solutions for treating textile fabrics of all kinds, yarns, paper, cellophane films, and vulcanizing molds. The substrates wetted with these solutions were dried and advantageously heated to 120° C. for a few minutes. All substrates treated in this manner contained $$C_{10}F_{21}(CH_2)_3O(CH_2)_3Sn(O)OSn(O)(CH_2)_3O(CH_2)_3C_{10}F_{21}$$

and showed a strong oil- and hydrocarbon-repellent effect and were very strongly anti-adhesive.

EXAMPLE 28

Nine grams of butyltin trihydride together with 110 g. of $CH_2=CH(CF_2)_9CF_3$ are heated, in 200 cc. of diisopropyl ether, for 6 hours at 50 to 60° C., while a total of 2 g. of azobis(isobutyronitrile) was added continuously. After the solvent had been distilled off, 40 g. of tin tetrachloride and 0.1 g. of AlCl_3 were added. The mixture was heated to 110° C. under stirring for 6 hours. The resulting mixture containing $$C_{10}F_{21}CH_2CH_2SnCl_3 \text{ and } C_{10}F_{21}CH_2CH_2Sn(C_4H_9)Cl_2$$

was used in alcoholic solution as impregnating agent for textiles.

EXAMPLE 29

Nine grams of butyltin trihydride together with 90 g. of $HC\equiv C(CF_2)_7CF_3$ are heated, in 200 cc. of diisopropyl ether, for 6 hours at 50 to 60° C., while a total of 2 g. of azobis(isobutyronitrile) was added continuously. After the solvent had been distilled off, 40 g. of tin tetrachloride and 0.1 g. of AlCl_3 were added. The mixture was heated to 110° C. under stirring for 6 hours. The resulting fluoroalkylchlorostannane mixture was used directly as impregnating agent for textiles.

EXAMPLE 30

Nine grams of diethyltin dihydride, together with 60 g. of $CH_2=CH-C_4H_8-C_{10}F_{21}$, were dissolved in 200 cc. of diisopropyl ether and boiled under reflux for 12 hours. 0.7 g. of azobis(isobutyronitrile) were added at the start of the reaction and every 3 hours thereafter. The operation was carried out under exclusion of oxygen. After 12 hours, the solvent was distilled off, and the residue was heated, with 40 g. of tin tetrachloride and 0.5 g. of zinc chloride, at 110 to 120° C. for 5 hours. This reaction mixture was reacted with sodium methoxide in 200 cc. of a methyl alcohol solution until the reaction was neutral, whereupon the solution was diluted to a concentration of 3% using methyl chloroform. This solution was used to saturate a mixed textile fabric consisting of wool and synthetic fiber, a roll of extracted synthetic sewing yarn, and a piece of suede. After being dried and heated at 80° C. for 30 minutes in moist atmosphere, the substrates became strongly oil- and hydrocarbon-repellent. They also repelled water in the form of beads.

EXAMPLE 31

Fifty grams of $ICH_2CH=CHCH_2C_8F_{17}$, which was prepared according to U.S. patent application Ser. No. 455,615, filed May 13, 1965, were boiled under reflux with 80 g. of tin powder and 2 g. of mercury chloride in 100 cc. of toluene for 30 hours. The solution was first disproportionated with tin tetrachloride, and then neutralized with alcoholic sodium methoxide solution; after the tin had been separated, the solution was used directly for the oil-repellent impregnation of textiles and paper. Advantageously, the solutions used varied between 0.1 and 3% with respect to the perfluoro compound.

As will be apparent to those skilled in the art, numerous modifications and variations of the examples illustrated above may be made without departing from the spirit of the invention or the scope of the following claims.

I claim:
1. A compound selected from the class consisting of

$$R_f(CY_2)_nSnX_3$$
$$R_f(CY_2)_nSn(Q)QH$$
$$R_f(CY_2)_nSn(Q)QSn(Q)(CY_2)_nR_f$$
$$[R_f(CY_2)_n]_2SnX_2$$
$$\{[R_f(CY_2)_n]_2SnO\}_p$$
$$\{R_f(CY_2)_nSn(R)O\}_p, \text{ and}$$
$$[R_f(CY_2)_n]_3SnX$$

in which Y is hydrogen or lower alkyl; X is chlorine, bromine, iodine, alkoxy, acyl, hydrogen, siloxyl or stannoxyl; Q is oxygen or sulfur; R is lower alkyl; $R_f$ is $CF_2Z(CF_2)_m$— where Z is fluorine, chlorine or hydrogen and m is 4–25; n is 2–8; and p designates a polymer.

2. Compounds of claim 1 in which Y is hydrogen; X is lower alkoxy; Q is oxygen; $R_f$ is $CF_3(CF_2)_m$— where m is 5–16; and n is 2–3.

3. Compounds of claim 1 which are copolymers of siloxanes of the formulae

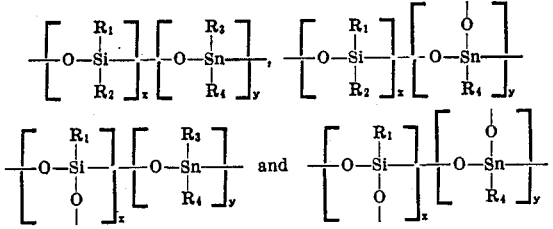

in which $R_1$, $R_2$ and $R_3$ are methyl, ethyl or $R_f(CY_2)_n$— where $R_f$ is $CF_2Z(CF_2)_m$— in which Z is fluorine, chlorine or hydrogen and m is 4–25, Y is hydrogen or methyl, and n is 2–8; $R_4$ is $R_f(CY_2)_n$—; x is 1–20; and y is 1–20.

4. Compounds of claim 3 in which Z is fluorine, m is 5–16, Y is hydrogen and n is 2–3.

5. Compounds of the formula $$CF_3(CF_2)_m(CH_2)_nSnCl_3$$

in which m is 5–16 and n is 2–3.

6. Compounds of the formula $$CF_3(CF_2)_m(CH_2)_nSn(OR)_3$$

in which m is 5–16, n is 2–3 and R is lower alkyl.

7. Compounds of the formula $$CF_3(CF_2)_m(CH_2)_nSn(O)OH$$

in which m is 5–16 and n is 2–3.

8. Compounds of the formula $$[CF_3(CF_2)_m(CH_2)_n]_2SnCl_2$$

in which m is 5–16 and n is 2–3.

9. Compounds of the formula $$[CF_3(CF_2)_m(CH_2)_n]_2Sn(OR)_2$$

in which m is 5–16, n is 2–3, and R is lower alkyl.

(References on following page)

References Cited

UNITED STATES PATENTS

| | | | |
|---|---|---|---|
| 2,682,512 | 6/1954 | Agre | 260—2 |
| 2,800,494 | 7/1957 | Haluska | 260—448.2 |
| 3,338,943 | 8/1967 | Speier | 260—448.2 |

FOREIGN PATENTS

| | | |
|---|---|---|
| 926,282 | 5/1963 | Great Britain. |
| 933,365 | 8/1963 | Great Britain. |

OTHER REFERENCES

Kaesz et al.: J.A.C.S., vol. 81, No. 23 (1959), p. 6336.

TOBIAS E. LEVOW, *Primary Examiner.*

W. F. W. BELLAMY, *Assistant Examiner.*

U.S. Cl. X.R.

167—22; 260—2, 46.5, 448.2; 252—139.5, 148, 140, 142, 161, 8.57, 8.6